United States Patent [19]
Singh et al.

[11] Patent Number: 5,818,844
[45] Date of Patent: Oct. 6, 1998

[54] ADDRESS GENERATION AND DATA PATH ARBITRATION TO AND FROM SRAM TO ACCOMMODATE MULTIPLE TRANSMITTED PACKETS

[75] Inventors: Alok Singh, Fremont; Rajat Roy, Sunnyvale; Jerry Kuo, San Jose, all of Calif.

[73] Assignee: Advanced Micro Devices, Inc., Sunnyvale, Calif.

[21] Appl. No.: 659,728

[22] Filed: Jun. 6, 1996

[51] Int. Cl.[6] .............................. G06F 13/16; H04L 12/56
[52] U.S. Cl. .................... 370/463; 370/474; 395/200.8
[58] Field of Search .................... 370/419, 439, 370/462, 463, 474; 395/200.8, 821, 823, 824, 842, 846, 848

[56] References Cited

U.S. PATENT DOCUMENTS

| | | | |
|---|---|---|---|
| 5,058,110 | 10/1991 | Beach et al. | 370/85.6 |
| 5,119,374 | 6/1992 | Firoozmand et al. | 370/455 |
| 5,434,976 | 7/1995 | Tan et al. | 395/200.64 |
| 5,602,995 | 2/1997 | Hendel et al. | 711/209 |
| 5,727,149 | 3/1998 | Hirata et al. | 395/200.8 |
| 5,729,681 | 3/1998 | Aditya et al. | 395/200.1 |

FOREIGN PATENT DOCUMENTS 0 150 084 A  7/1985  European Pat. Off. ........ G06F 13/36

*Primary Examiner*—Hassan Kizou
*Attorney, Agent, or Firm*—H. Donald Nelson

[57] ABSTRACT

An ethernet controller for controlling the transmission of data between a station and an ethernet having four FIFOs for managing the transmission of data between the station CPU, a memory buffer, and the ethernet. The four FIFOs each have a selected size to maximize performance of the controller. The controller includes a arbiter to arbitrate which pending requests from each of the FIFOs will have priority. The controller limits the transmission of data by each FIFO to 32 bytes per grant. Each FIFO includes logic to convert data in a first bit size format to a second bit size format. The controller also includes logic to convert a 16 bit address to two 8 bit portions for transmission over an 8 bit address bus and logic to reformat the two 8 bit portions to the 16 bit address.

14 Claims, 6 Drawing Sheets

ARBITRATION ALGORITHM

ADDRESS GENERATION AND DATA PATH ARBITRATION TO AND FROM SRAM TO ACCOMMODATE MULTIPLE TRANSMITTED PACKETS

BACKGROUND OF THE INVENTION

1. Field of the Invention

This invention relates generally to a method and device for controlling the transmission of information by a station to and from an ethernet and more particularly, to a method and device for increasing the performance of the transmission of information and even more particularly, to a method and device for converting data from a first bit width to a second bit width, generating addresses for the converted data, and arbitrating access to a data path for read or write access to and from an SRAM buffer.

2. Discussion of the Related Art

This application is related to U.S. patent application, Ser. No. 08/659,733 entitled "DATA STRUCTURE TO SUPPORT MULTIPLE TRANSMIT PACKETS FOR HIGH PERFORMANCE" invented by Rajat Roy, Jeffrey Dwork, and Jenny Fischer and U.S. patent application, Ser. No. 08/659,795, entitled "END OF PACKET DETECTION FOR STORING MULTIPLE PACKETS IN AN SRAM" invented by Alok Singh and Rajat Roy, both applications assigned to the assignee of this application and both filed on the same date as this application.

A local-area network ("LAN") is a communication system that enables personal computers, work stations, file servers, repeaters, data terminal equipment ("DTE"), and other such information processing equipment located within a limited geographical area such as an office, a building, or a cluster of buildings to electronically transfer information among one another. Each piece of information processing equipment in the LAN communicates with other information processing equipment in the LAN by following a fixed protocol (or standard) which defines the network operation.

The ISO Open Systems Interconnection Basic Reference Model defines a seven-layer model for data communications in a LAN. The lowest layer in the model is the physical layer which consists of modules that specify (a) the physical media which interconnects the network nodes and over which data is to be electronically transmitted, (b) the manner in which the network nodes interface to the physical transmission media, (c) the process for transferring data over the physical media, and (d) the protocol of the data stream.

IEEE Standard 802.3, Carrier Sense Multiple Access with Collision Detection (CSMA/CD) Access Method and Physical Layer Specifications, is one of the most widely used standards for the physical layer. Commonly referred to as Ethernet, IEEE Standard 802.3 deals with transferring data over twisted-pair cables or co-axial cables which are typically more expensive than twisted-pair cables. The 10Base-T protocol of IEEE Standard 802.3 prescribes a rate of 10 megabits/second ("Mbps") for transferring data over twisted-pair cables.

Referring to the drawings, FIG. 1 illustrates how a prior art system 10 with a workstation, personal computer, file server, data terminal equipment, or other such information processing equipment, represented by CPU 12, is connected to an ethernet 22 or other types of data communications equipment represented by the media independent interface 24. In FIG. 1, ethernet controller 14, also commonly known as a Network Interface Controller, is situated between the CPU 12 and the incoming (and outgoing) ethernet 22 lines. Typically, the ethernet 22 connection consists of two pairs of twisted-pair copper cables, an incoming pair referred to as 10R and an outgoing pair referred to as 10T.

The ethernet controller 14 is responsible for controlling the transmission of outgoing data to the outgoing pair or cable and the reception of incoming data from the incoming pair or cable. For example, before being furnished to the outgoing pair or cable, the outgoing data is Manchester encoded to reduce electromagnetic interference. The Manchester encoding causes some portions of the data stream to be pulses at 10 MHz while other portions of the data stream are pulses at 5 MHz.

The ever growing need to transfer more information faster, accompanied by increases in data processing capability, is necessitating an expansion to data transfer rates considerably higher than the 10 Mbps rate prescribed by the 10Base-T protocol. As a consequence there is a 100Base-TX protocol which extends IEEE Standard 802.3 to accommodate data moving at an effective transfer rate of 100 Mbps through twisted-pair cables of presently existing systems. There are situations in which it is desirable that the physical transmission media be capable of handling data transferred through twisted-pair cables at both the 100Base-TX rate and the lower 10Base-T rate. Presently there is a need to support a PCI speed of 33 MHz on the internal PCI bus and a need to support an ethernet speed of 25 MHz maximum for the 100 MBits per second operation in order to support the full duplex mode of operation with an interpacket gap of 9.6 microseconds.

In addition to the problems associated with the transmission of data at different rates over the ethernet or the media independent interface, there are the problems associated with the varying data handling capabilities of the personal computers, workstations, file servers, repeaters, data terminal equipment, and other such information processing equipment. For example, in a personal computer system there may be other equipment or duties that the CPU 12 must attend to in addition to the receipt or transmission of data over the ethernet 22.

The ethernet controller 14 is responsible for controlling the transmission of data from the CPU 12 to the ethernet 22. One of the major problems confronted by the ethernet controller 14 is that the different memory devices in the various components are of differing sizes. For example, there is a requirement to keep semiconductor devices as small as possible. For that reason, it is advantageous to have bus sizes as small as possible without degrading performance of the device. As can be appreciated, a 16 bit bus is half the size of a 32 bit bus and if it is possible to provide the same performance with a 16 bit bus as a 32 bit bus it is preferable to design the part with a 16 bit bus. In addition, the smaller the bus size the less probability for manufacturing defects in the bus.

Referring to FIG. 2 the differing size components are illustrated. The SRAM 16 is a 16 bit memory device, data bus 20 is a 16 bit data bus, and the PCI BUS 18 is typically a 32 bit bus. There are presently 64 bit PCI Buses and future computer systems may all have the 64 bit PCI Bus as a standard bus size. The SRAM 16 is used as a buffer by ethernet controller 14 to prevent delays from occurring in the transmission of data either to the ethernet 22 to the CPU 12 or from the CPU 12 to the ethernet 22. Such delays could be caused, for example, by high latency in the CPU 12 or by a collision on the ethernet 22 causing a sending station to have to retransmit information that has just been sent. The various FIFOs, BX FIFO 26, MX FIFO 28, BR FIFO 30, and MR FIFO 32 are responsible for controlling the transmission of data between the various components. For example, BX FIFO 26 is responsible for receiving data from CPU 12 via PCI BUS 18, changing the format from 32 bits to 16 bits so that it can be transmitted over the 16 bit data bus 20 to SRAM 16. In addition, there is a requirement for addresses to be generated by BX FIFO 26 and MR FIFO 32 so that the information can be placed into SRAM 16 and retrieved efficiently by MX FIFO 28 and BR FIFO 30 respectively, which are responsible for changing the format from 16 bits as received from SRAM 16 into a 32 bit format.

In addition, because there is the possibility that there will be a need to receive data at the same time that there will be need to send data via ethernet 22 and also that there will be a need for the ethernet controller 14 to receive data from CPU 12 at the same time that there will be a need to send data to the CPU 12 there is a necessity for ethernet controller 14 to make intelligent choices for which data will be sent or received first and in what sequence subsequent data will be sent or received.

What is needed is a method of efficiently changing the size of data from 32 bits to 16 bits for storage in the memory device and a method for generating addresses for the 16 bit data to be stored in the SRAM, a method of efficiently changing the size of data from 16 bits to 32 bits for retrieval from the SRAM and for generating addresses for the retrieved 32 bit data, and a method to arbitrate between the various write and read functions controlled by the ethernet controller.

SUMMARY OF THE INVENTION

In accordance with the present invention, an ethernet controller for controlling the transmission of data between a station and an ethernet. The ethernet controller includes four FIFOs with associated logic form managing the transmission of data from the station CPU to a buffer memory, from the buffer memory to the ethernet, from the ethernet to the buffer memory, and from the buffer memory to the station CPU. The ethernet controller includes an arbiter which arbitrates which FIFO will have priority for the transmission of data.

The logic associated with each FIFO converts the bit size of the data from a first bit size to a second bit size, generates addresses for writing or reading to or from the buffer memory. The logic also converts a 16 bit address into two 8 bit portions for communication over an 8 bit address bus and also converts the two 8 bit portions to the original 16 bit address.

The arbiter limits each FIFO to a 32 byte transmission per request and after each 32 byte transmission polls the other FIFOs to determine if there is a pending request for a transmission. The arbiter grants requests per an arbitration algorithm.

Each FIFO has a selected size selected to maximize performance of the ethernet controller.

The present invention is better understood upon consideration of the detailed description below, in conjunction with the accompanying drawings. As will become readily apparent to those skilled in this art from the following description there is shown and described a preferred embodiment of this invention simply by way of illustration of the mode best suited to carry out the invention. As it will be realized, the invention is capable of other different embodiments, and its several details are capable of modifications in various, obvious aspects all without departing from the scope of the invention. Accordingly, the drawings and descriptions will be regarded as illustrative in nature and not as restrictive.

BRIEF DESCRIPTION OF THE DRAWINGS

The accompanying drawings incorporated in and forming a part of the specification, illustrate the present invention, and together with the description serve to explain the principles of the invention. In the drawings.

DETAILED DESCRIPTION

Figure 1:
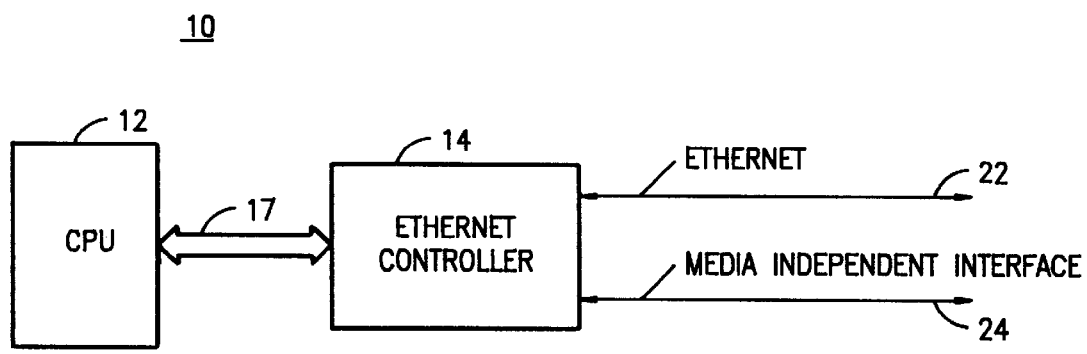
FIG. 1 shows an overall view of a prior art system with a CPU and an ethernet controller with an ethernet connection and a media independent interface connection.

Referring now to FIG. 1 there is shown an overview of a prior art system 10 with a CPU 12, and an ethernet controller 14 with connections an ethernet 22 and a media independent interface 24. The CPU 12 is connected to the ethernet controller 14 by BUS 17.

Figure 2:
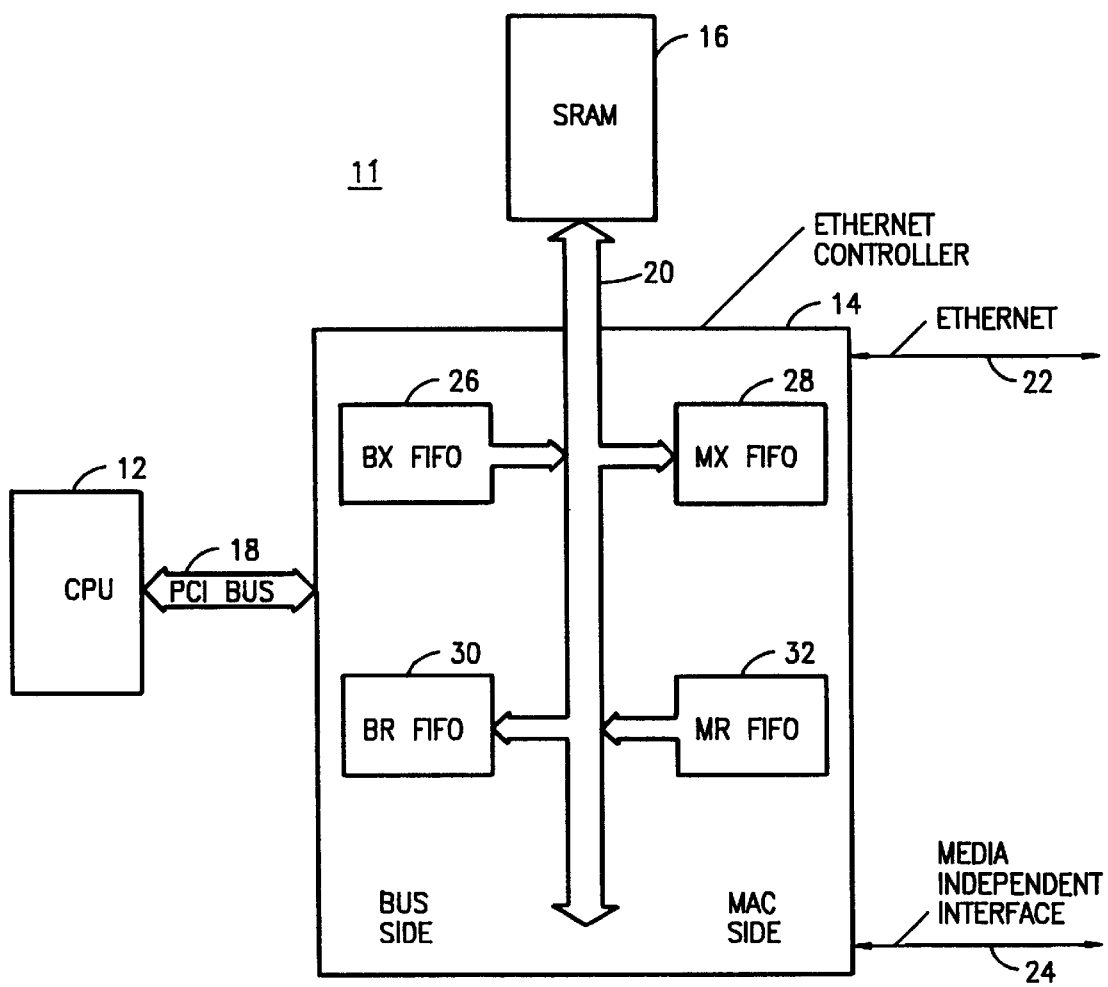
FIG. 2 shows a system as taught by the present invention.

Referring now to FIG. 2, there is shown a system 11 as taught by the present invention. In this and subsequent figures like numerals will be used to denote like components. A portion of the ethernet controller 14 is shown in FIG. 2. It is to be understood that the ethernet controller 14 has many other functions than the functions as taught by the present invention and only those components that are pertinent to the present invention are discussed.

The function of the illustrated portion of the ethernet controller 14 is to manage the transmission of data to and from the ethernet 22 and/or the media independent interface 24. The ethernet controller 14 manages the transmission of data by utilizing SRAM 16 as a buffer to prevent the slowing down of the transmission of data to and from either the CPU 12 or the ethernet 22 or the media independent interface 24. There are various reasons that the transmission of data can be slowed down, for example, the latency of CPU 12 can be high and the transmission of data from the ethernet 22 could be stopped until CPU 12 is freed from other interrupts. Conversely, the CPU 12 could be attempting to send data via the ethernet 22 and the ethernet 22 could be busy which would cause the data from the CPU 12 to be stopped or held until the ethernet 22 is free.

To avoid problems caused by not being able to complete the sending or the receiving of information, the ethernet controller 14 has four FIFOs, each with a selected size to maximize the performance of the ethernet controller 14. BX FIFO 26 is a 180 Byte FIFO, MX FIFO 28 is a 112 Byte FIFO, BR FIFO 30 is a 160 Byte FIFO, and MR FIFO 32 is a 108 Byte FIFO. The BX FIFO 26 and the BR FIFO 30 are on the BUS side of ethernet controller 14 and MX FIFO 28 and MR FIFO 32 are on the MAC (Media Access Control) side of the ethernet controller 14. Each of the FIFOs manages either an input or output function. The BX FIFO 26 manages the transmission of data from CPU 12 to SRAM 16. MX FIFO 28 manages the transmission of data from SRAM 16 to the ethernet 22 or the media independent interface 24. Similarly, MR FIFO 32 manages the transmission of data from either the ethernet 22 or the media independent interface 24.

Figure 3:
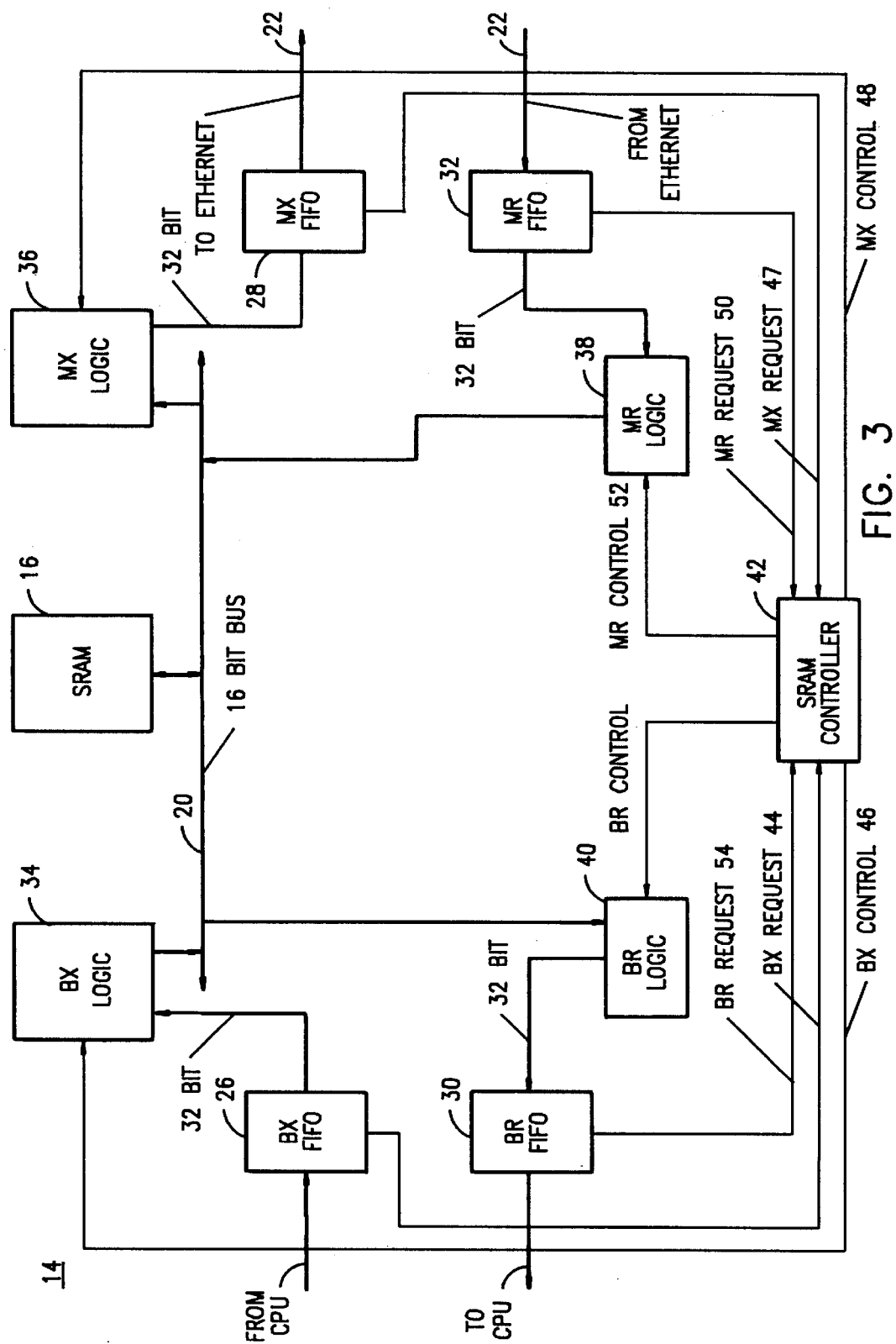
FIG. 3 shows the ethernet controller in more detail.

Referring now to FIG. 3, the ethernet controller 14 is shown in more detail. Each of the four FIFOs discussed in conjunction with FIG. 2 include or is associated with a logic block. BX FIFO 26 is associated with BX LOGIC 34 which generates addresses for SRAM 16 and prepares 32 bit data from the CPU to be transmitted over the 16 bit data path 20 to SRAM 16, MX FIFO 28 is associated with MX LOGIC 36 which generates addresses for the 16 bit data to be retrieved from SRAM 16, reads the 16 bit data in SRAM 16, converts the 16 bit data retrieved from SRAM 16 to 32 bits, and writes the 32 bit data to MX FIFO 28. MR FIFO 32 is associated with MR LOGIC 38 which converts data received by MR FIFO 32 from ethernet 22 to a 16 bit size and generates addresses for the 16 bit data which is to be written in SRAM 16, and BR FIFO 30 is associated with BR LOGIC 40 which reads data in SRAM 16 that had been received from ethernet 22, changes the data from 16 bit size to 32 bit size and writes the 32 bit size data in BR FIFO 30 from which it will be sent to the CPU 12.

SRAM CONTROLLER 42 controls the four FIFOs and in cases of conflict, that is, when more than one FIFO requests the bus to transmit data, the SRAM CONTROLLER 42 arbitrates according to a predetermined algorithm which determines which FIFO will have priority and in which order. The algorithm is discussed below.

The overall operation of the system shown in FIG. 3 is as follows. The ethernet controller 14 is responsible for the overall operation of the transmission of data from the CPU 12 to the ethernet 22 and for the transmission of data from the ethernet 22 to the CPU 12. As discussed above, one of the major problems with the transmission of data to and from the ethernet 22 is that there are various factors that can affect the efficient transmission of any such data. One factor is the different speeds that must be accommodated. The PCI BUS 18 operates at a speed of 33 MHz and the ethernet 22 operates at a maximum speed of 25 MHz for the 100 Mbit operation which supports full duplex operation with an interpacket gap of 0.96 microseconds. One of the major functions of ethernet controller 14 is to manage the transfer of data between the various components in such a way as to minimize any delay in either receiving or transmitting such data. For example, when CPU 12 (not shown) wishes to send data to the ethernet 22 it communicates with, and sends data to BX FIFO 26. BX FIFO 26 requests access to the bus from SRAM CONTROLLER 42 via BX REQUEST LINE 44. When BX LOGIC 34 receives a grant from SRAM CONTROLLER 42 via BX CONTROL LINE 46, BX LOGIC 34 changes the 32 bit size data received from the CPU 12 to 16 bit size data and generates addresses for the SRAM 16 for the storage of the data in 16 bit format. The converted data is communicated to and written in SRAM 16 via the 16 bit bus 20. BX LOGIC 34 is a state machine which controls the flow of data from BX FIFO 26 to SRAM 16 and will operate once it gets a grant signal from SRAM CONTROLLER 42. Because BX FIFO 26 is 32 bits wide and the data bus 20 is 16 bits wide, it will take BX LOGIC 34 two cycles to write the 16 bit size data to SRAM 16 as it can only write 16 bits on a 16 bit size data bus in each cycle. It has been determined that the transfer of data via BX FIFO 26 is maximized, that is, any delay in the transfer of data via BX FIFO 26 is minimized by having the size of BX FIFO 26 at 180 Bytes. As will be discussed below, SRAM CONTROLLER 42 manages the receiving and transmitting of data through all FIFOs including BX FIFO 26 in accordance with an arbitration algorithm that maximizes the performance of the system 11.

The size of SRAM 16 is selectable and in this embodiment has been selected to be 64K Bytes, however, it is expandable to at least 128K Bytes. Therefore, it is necessary to have 16 bits of address to access each memory location. However, the ethernet controller 14 has only 8 bits of address ports to save space and to be more cost effective. For this reason, a 16 bit address must be divided into an upper 8 bit portion and a lower 8 bit portion, transmitted via an 8 bit address bus, and reassembled outside the ethernet controller 14 into a 16 bit address. The details of the address generation and transmission are discussed below in conjunction with FIGS. 6 & 7.

The ethernet controller 14 is in constant communication with the ethernet network via MX FIFO 28 and depending upon what type of protocol is used, the system determines when data can be sent via ethernet 22. When data can be sent via ethernet 22, MX FIFO 28 requests access to the data bus 20 via MX REQUEST LINE 47 from SRAM CONTROLLER 42. When access is granted and communicated via MX CONTROL LINE 48 to MX LOGIC 36 the data which has been either temporarily written in SRAM 16 or is in MX FIFO 28, will be or has been converted into the original 32 bit form as received from the CPU 12 by BX FIFO 26, will be transmitted by MX FIFO 28 via ethernet 22. MX FIFO 28 is a state machine that controls the flow of data from SRAM 16 to MX FIFO 28 and operates when it gets a grant signal from SRAM CONTROLLER 42. The MX FIFO 28 is 32 bits wide and the data bus 20 is 16 bits wide, therefore, after MX LOGIC 36 has read 16 bits of data twice and using logic to assemble them in a double word (32 bits) a write signal is given to MX FIFO 28. This means that a write to MX FIFO 28 is given every alternate cycle and a read from SRAM 16 is done every cycle. MX FIFO 28 controls the read from SRAM 16 and the write to MX FIFO 28.

When MR FIFO 32 senses that there is information from the ethernet to be received, MR FIFO 32 requests access from SRAM CONTROLLER 42 to the data bus 20 via MR REQUEST LINE 50. When SRAM CONTROLLER 42 grants access via MR CONTROL LINE 52 the data received by MR FIFO 32 is converted to 16 bit format by MR LOGIC 38 and sent to SRAM 16 via the 16 bit data bus 20. The operation of the MR LOGIC 38 is similar to the operation of the BX LOGIC 34 discussed above.

When the CPU is ready to receive the data received from the ethernet, BR FIFO 30 requests access from SRAM CONTROLLER 42 to the data bus 20 via BR REQUEST LINE 54. When access is granted, SRAM CONTROLLER 42 communicates to BR LOGIC 40 which reads the data from SRAM 16, converts the data which has been stored in 16 bit data format to a 32 bit data format, and forwards the data to BR FIFO 30, which, in turn, sends the data to the CPU. The operation of BR LOGIC 40 is similar to the operation of MX LOGIC 36 discussed above.

Figure 4:
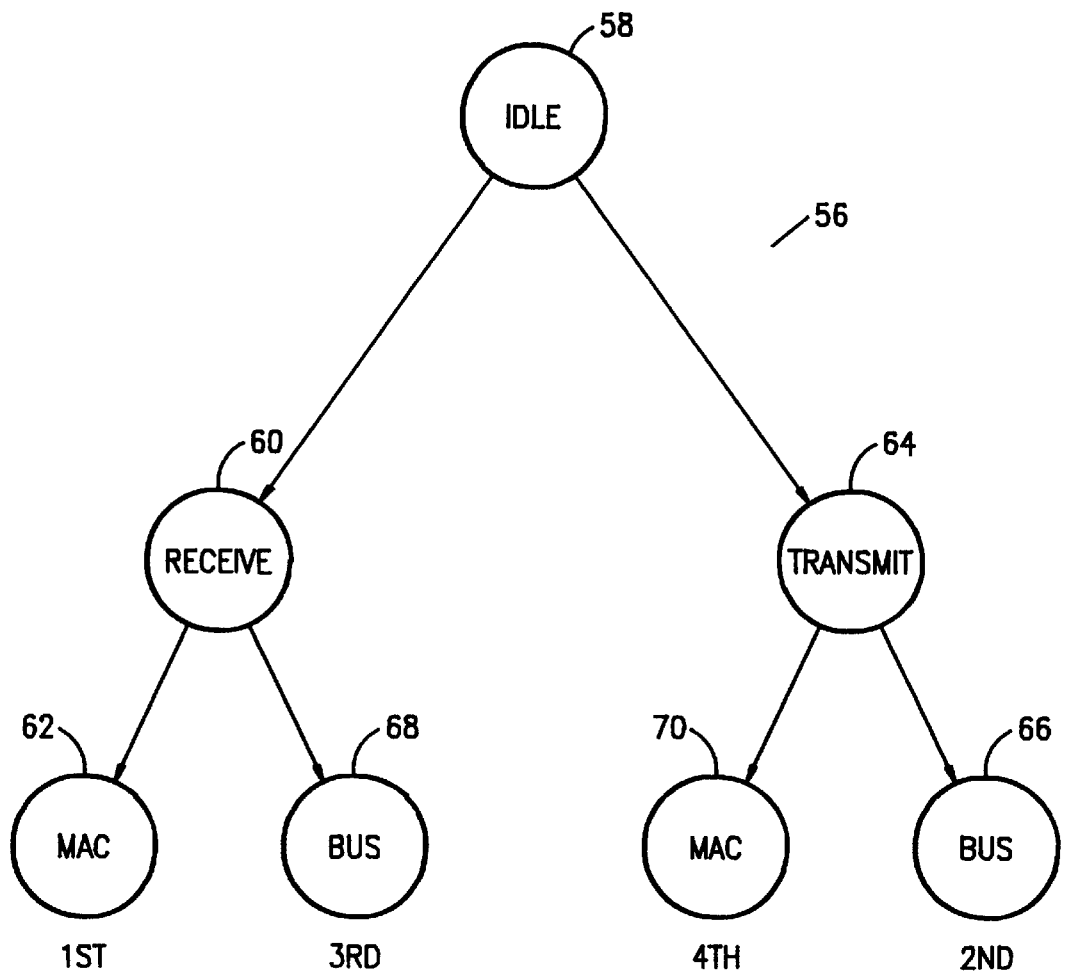
FIG. 4 illustrates the arbitration algorithm used by the ethernet controller to arbitrate the sequence of read and write accesses.

Referring now to FIG. 4, there is shown an arbitration algorithm 56 which indicates in which order SRAM CONTROLLER 42 (FIG. 4) will handle requests for the bus for those cases where there are multiple requests at the same time. The SRAM CONTROLLER 42 uses the arbitration scheme shown in FIG. 4 to handle requests from all four logic blocks.

In addition, the present invention teaches that there is an optimum number of bytes that should be transferred between components in the ethernet controller 42. It has been determined that this optimum number of bytes is approximately 32. This means, for example, that there should be assembled in BX FIFO 26 32 bytes of data before a request is made by BX FIFO 26 for the bus (the only exception is when the last byte to be transferred is detected to be in BX FIFO 26). In addition, it has also been determined that 32 bytes is the optimum number of bytes to be transferred from one component to the next. When the limit, in this case 32 bytes, has been reached, the system will pause in either sending or receiving and poll the other functions to determine whether there is other information that needs to be sent or received.

Referring again to FIG. 4, in the first case where there are multiple requests at the same time and the system is at idle, indicated at 58, the system will look first to the receive side, indicated at 60, and grant access first to the MAC side receive, indicated at 62. If there is no request pending at 62, the system will then go to the transmit side, indicated at 64 and if there is a request pending at the bus transmit, indicated at 66, will grant access to bus transmit. If there is no request pending at the bus transmit, the system will back out, go to the receive side 60, and grant access to bus receive, indicated at 68. If there is no request pending at 68, the system will then look to transmit 64 then to MAC transmit, indicated at 70.

In the case in which the system pauses to poll other functions to determine if there are pending requests for the data bus, the system will grant a pending request in the same order as described above.

Figure 5:
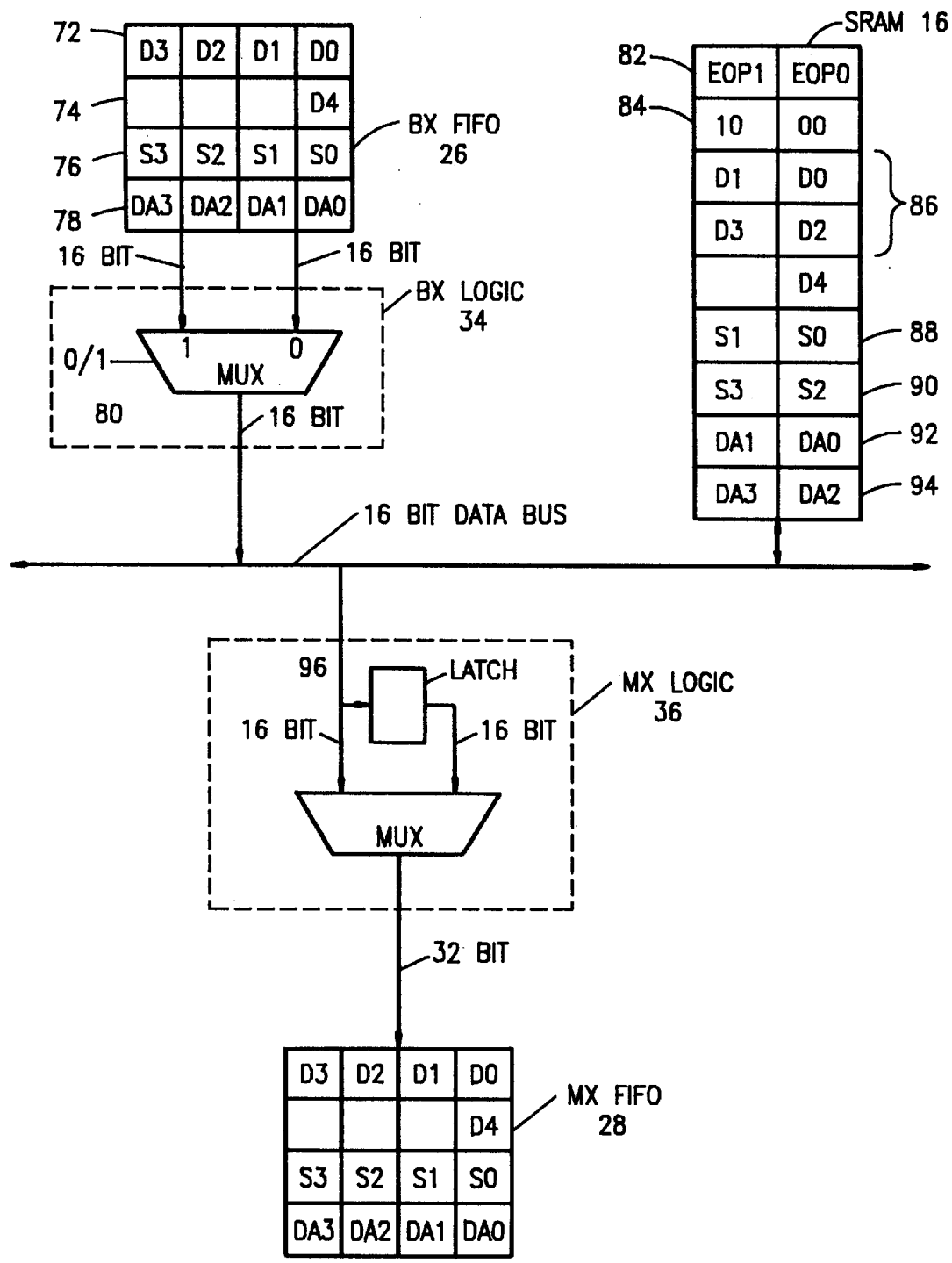
FIG. 5 illustrates how the different bit size data is located in differing size memory locations.

Referring now to FIG. 5, there is illustrated how the byte sized data is stored in the various components in the system. There is shown a small portion of BX FIFO 26 with five bytes of data, D0 through D4 stored in the FIFO in locations indicated at 72 and 74. Also shown are 32 bits of STATUS data stored in 8 bit bytes, S0 through S3, in locations indicated at 76. There are shown 32 bits of DESCRIPTOR data, DA0 through DA3, stored in 8 bit bytes in memory locations indicated at 78. BX LOGIC 34 reads the 32 bit data from BX FIFO 26 and converts it to a 16 bit size at 80 and puts the 16 bit data onto 16 bit data bus 20. The 16 bit data is written into SRAM 16 and is written as shown. The first memory location, indicated at 82, is reserved by the system and contains two 8-bit bytes, labeled EOP0 and EOP1, which represent information concerning where the end-of-packet is located, that is, in which memory location data byte D4 is located. The second memory location, indicated at 84, is also reserved by the system and contains two 8-bit bytes, which read in this example, HEX10 in the upper byte location and HEX00 in the lower byte location. The data, D0 through D4, is in memory locations indicated at 86, followed by two 16 bit memory locations indicated at 88 and 90 where the four 8 bit bytes of STATUS data (S0–S3) are located. Following the STATUS data information memory locations, are four 8 bit bytes of DESCRIPTOR data (DA0–DA3) located in memory locations indicated at 92 and 94.

When MX FIFO 28 is granted access to the data bus 20 as described above, the 16 bit data is read from SRAM 16, converted into 32 bit data at 96 and forwarded to MX FIFO 28.

The above explanation described the transmission of data from the bus side to the MAC side of the ethernet controller 14, that is, from the CPU 12, (not shown), to BX FIFO 26, to SRAM 16, to MX FIFO 28, then to ethernet 22. It is to be understood that the same explanation is applicable when the data is received at MR FIFO 32, sent SRAM 16, read by BR FIFO 30, and then sent to the CPU 12.

Figure 6:
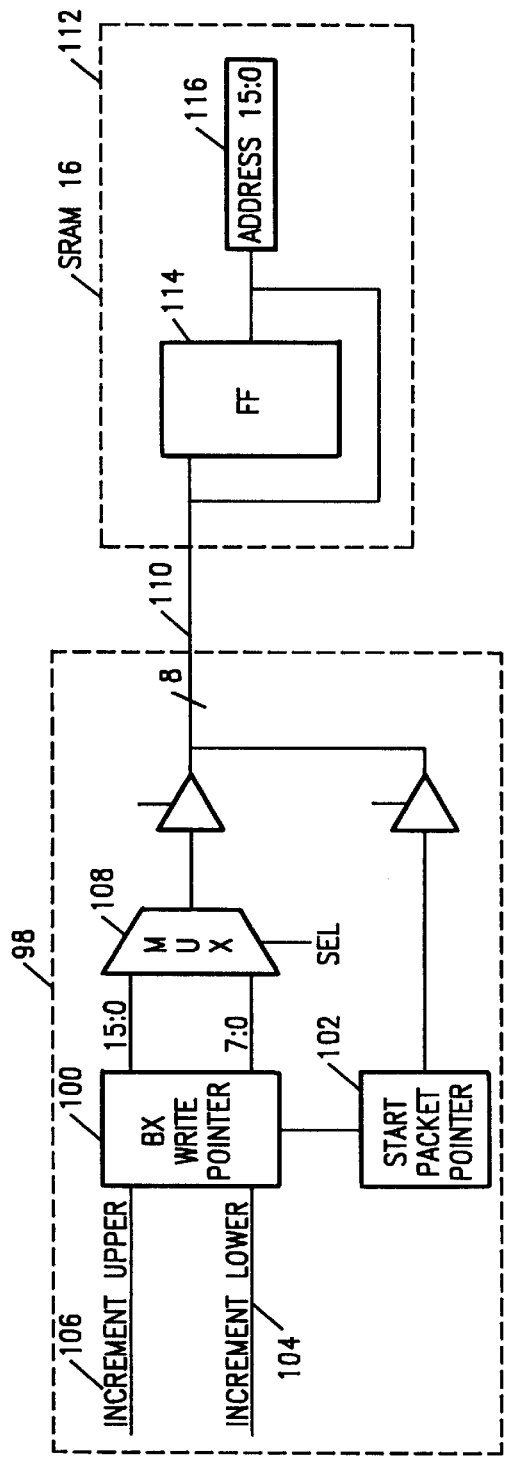
FIG. 6 illustrates the method of address generation for writing data to the SRAM buffer memory.

Referring now to FIG. 6, there is illustrated the method of address generation when data is being written into the SRAM 16. The address generation portion of BX LOGIC 26 is shown within dashed line 98 and the address generation portion of MR LOGIC 38 (FIG. 3) would be the same. The method of generating addresses for the SRAM 16 begins with the BX WRITE POINTER 100 pointing at a memory location in which the next packet of information will be written. When the packet begins to be written into memory, the starting memory location is stored in register START PACKET POINTER 102. Therefore, the START PACKET POINTER 102 holds the address of the memory location in SRAM 16 from where BX LOGIC 26 begins writing a packet. The starting memory location is written with the memory location of the end-of-packet. Because the 16 bit address must be communicated via an 8 bit address bus the 16 bit address must be divided into two 8 bit portions. In order to generate addresses as the data is written it is necessary to increment the lower 8 bit portion of the address as each byte is being written. The upper 8 bit portion is incremented each time a page has been written, that is, when the lower 8 bits read HEXFF. Therefore, BX WRITE POINTER 100 has an increment lower input 104 which increments BX WRITE POINTER 100 each time a byte is written into SRAM 16 and the increment upper input 106 increments BX WRITE POINTER 100 each time a new page is begun, that is, after the lower address byte reaches the value HEXFF. The BX WRITE POINTER 100 then contains the 16 bit address of the memory location into which the byte just written was written. Because the 16 bit address is communicated over an 8 bit address bus, a MUX 108 reformats the 16 bit address into an upper 8 bit portion and a lower 8 bit portion which is communicated via an 8 bit bus represented at 110 to SRAM 16, a portion of which is shown within dashed lines 112. The SRAM 16 at 114 converts the two 8 bit address portions into a 16 bit address, indicated at 116. When the end-of-packet has been written into SRAM 16 the memory location into which the end-of-packet has been written is written into the starting memory location which has been recorded in START PACKET POINTER 102.

Figure 7:
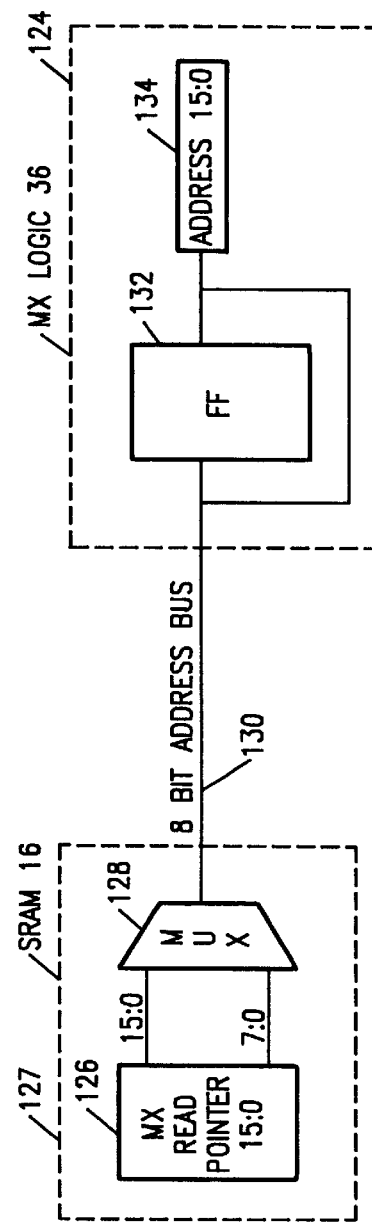
FIG. 7 illustrates the method of address generation for retrieving data from the SRAM buffer memory.

Referring now to FIG. 7, there is shown the read address generation portion, indicated within dashed line 124 of MX LOGIC 36 which generates a read address for reading data from SRAM 16. A read pointer 126 in a portion of SRAM 16 (shown within dashed line 127) points to a 16 bit memory location in which the byte just read is located. The 16 bit memory location is converted by MUX 128 into two 8 bit portions to be placed on the 8 bit address bus, indicated at 130. The two 8 bit address portions are received by MX LOGIC 36 and are reassembled by flip-flop 132 into a 16 bit address, indicated at 134.

The foregoing description of the preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications which are suited to the particular use contemplated. All such modifications and variations are within the scope of the invention as determined by the appended claims when interpreted in accordance with the breadth to which they are fairly, legally, and equitably entitled.

What we claim is:

1. An ethernet controller for controlling the transmission of data between a station having a CPU and the ethernet, comprising:

a memory;

a first FIFO for managing the transmission of CPU data from the CPU to the memory and a first logic associated with the first FIFO for converting CPU data from a first bit size to a second bit size and for generating addresses for writing the CPU data in the second bit size into the memory;

a second FIFO for managing the transmission of the CPU data from the memory to the ethernet and a second logic associated with the second FIFO for generating addresses for reading the CPU data in the memory and for converting the data from the second bit size to the first bit size;

a third FIFO for managing the transmission of ethernet data from the ethernet to the memory and a third logic associated with the third FIFO for converting ethernet data from the first bit size to the second bit size and for generating addresses for writing the ethernet data in the second bit size in the memory;

a fourth FIFO for managing the transmission of ethernet data from the memory to the CPU and a fourth logic associated with the fourth FIFO for generating addresses for reading the ethernet data in the memory and for converting the ethernet data from the second bit size to the first bit size; and an arbiter to control each FIFO wherein the arbiter limits the transmission through each FIFO to a selected number of bytes and wherein the arbiter polls each FIFO after a transmission of the selected number of bytes to determine if a request for a transmission is pending.

2. The controller of claim 1, wherein the selected number of bytes is 32 bytes.

3. The controller of claim 2, wherein the arbiter grants requests from the FIFOs according to an arbitration algorithm.

4. The controller of claim 3, wherein the arbitration algorithm grants priority at a first level for access to a receive FIFO and between the receive FIFOs the arbitration algorithm grants priority to the receive FIFO with a pending request on a media access side of the ethernet controller and the arbitration algorithm grants second priority at the first level to a transmit FIFO and between the transmit FIFOs the arbitration algorithm grants priority to the transmit FIFO with a pending request on a bus side of the ethernet controller.

5. The controller of claim 4, wherein the first FIFO has a first selected size.

6. The controller of claim 5, wherein the second FIFO has a second selected size.

7. The controller of claim 6, wherein the third FIFO has a third selected size.

8. The controller of claim 7, wherein the fourth FIFO has a fourth selected size.

9. The controller of claim 8, wherein the first selected size is 180 bytes.

10. The controller of claim 9, wherein the second selected size is 112 bytes.

11. The controller of claim 10, wherein the third selected size is 108 bytes.

12. The controller of claim 11, wherein the fourth selected size is 160 bytes.

13. The controller of claim 12, further comprising first means for reformatting a 16 bit address into a first 8 bit portion and a second 8 bit portion for transmission over an 8 bit address bus.

14. The controller of claim 13, further comprising second means for reformatting the first and second 8 bit address portions into the 16 bit address after being transmitted over the 8 bit address bus.

* * * * *